May 29, 1956  W. LEWIS, SR., ET AL  2,747,684
REPACK CARTRIDGE
Filed Jan. 12, 1951

INVENTOR.
Warner Lewis Sr.
J. P. Cox
BY
C. M. McKnight
ATTORNEY

United States Patent Office 2,747,684
Patented May 29, 1956

2,747,684

REPACK CARTRIDGE

Warner Lewis, Sr., and Jasper P. Cox, Tulsa, Okla., assignors to Warner Lewis Company, Tulsa, Okla., a corporation of Delaware Application January 12, 1951, Serial No. 205,746

2 Claims. (Cl. 183—47)

This invention relates to a repack cartridge for use with an oil and gas separator.

It is well known that separators of all types, and particularly oil and gas separators used in the oil industry, are provided with a filtering medium usually consisting of a cylindrical bundle of excelsior. Formerly, when it was desired to replace the filtering medium, the excelsior was removed in small bunches either by hand or with the use of a hay hook, or the like. The new excelsior was installed in the separator in a similar manner, i. e. the excelsior was placed in the separator in small bunches and tamped with a ram to evenly distribute the excelsior in the separator body. This process was repeated until the desired length of bundle was obtained. There has been devised a repack cartridge to facilitate replacement of the filtering medium, however, the cartridge is provided with a metallic covering and it is necessary to seal the cartridge to the inner walls of the separator body by use of gaskets and holddown rods to prevent the hydro-carbon product being filtered from bypassing the filtering medium.

The present invention contemplates a novel self-sealing repack cartridge which may be placed as a unit in a separator. The cartridge expands in a radial direction upon being moistened to efficiently seal the cartridge to the inner walls of the separator, and prevent bypassing of the hydro-carbon product.

An important object of this invention is to provide a novel self sealing repack cartridge.

Another object of this invention is to reduce the time presently required to repack an oil and gas separator.

A further object of this invention is to provide a practical and efficient repack cartridge.

A still further object of this invention is to provide a simple repack cartridge which may be economically manufactured.

Other objects and advantages of the invention will be evident from the detailed description, read in conjunction with the accompanying drawings, which illustrate my invention.

Figure 1:
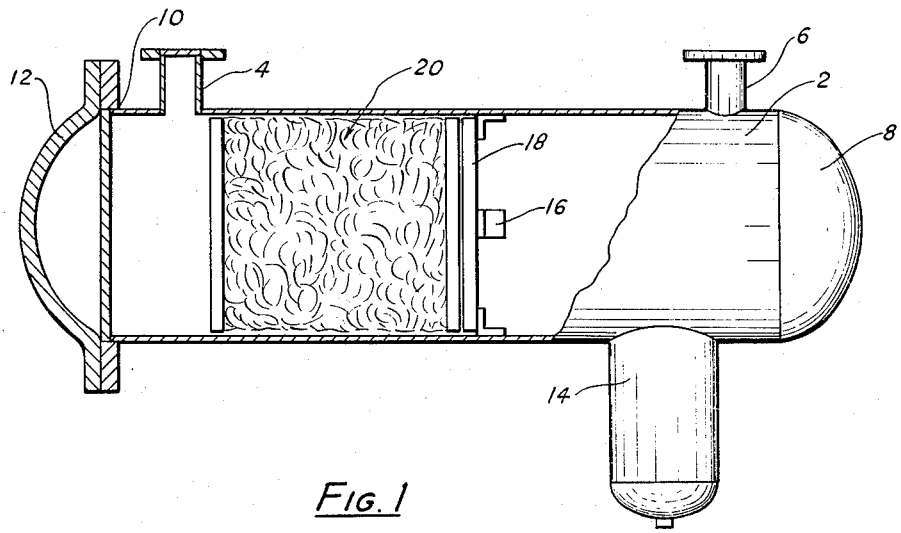
Figure 1 is an elevational view partially in section of an oil and gas separator having a novel repack cartridge therein.

Referring to the drawings in detail, reference character 2 indicates an oil and gas separator having the usual inlet and outlet nozzles 4 and 6. The rear end 8 of the separator 2 is permanently enclosed and the forward end 10 is enclosed by a removable head portion 12. A water accumulator chamber 14 depends from the separator 2 adjacent the end 8 thereof to provide an intermediate storage chamber for water separated in the separator 2. A suitable valved drain line (not shown) is provided for the accumulator 14 in the usual manner. A plurality of circumferentially placed retaining clips 16 are provided in the medial portion of the separator 2 to receive a grid member 18. The grid 18 is of the usual type having vertical and horizontal cross bars (not shown) therein, and the grid 18 may be either rigidly or removably secured to the retaining clips 16. A novel repack cartridge generally indicated at 20 is disposed in the separator body 2 adjacent the grid 18 to remove water entrained in hydrocarbon fluid passing through the separator 2, as will be more fully hereinafter set forth.

Figure 2:
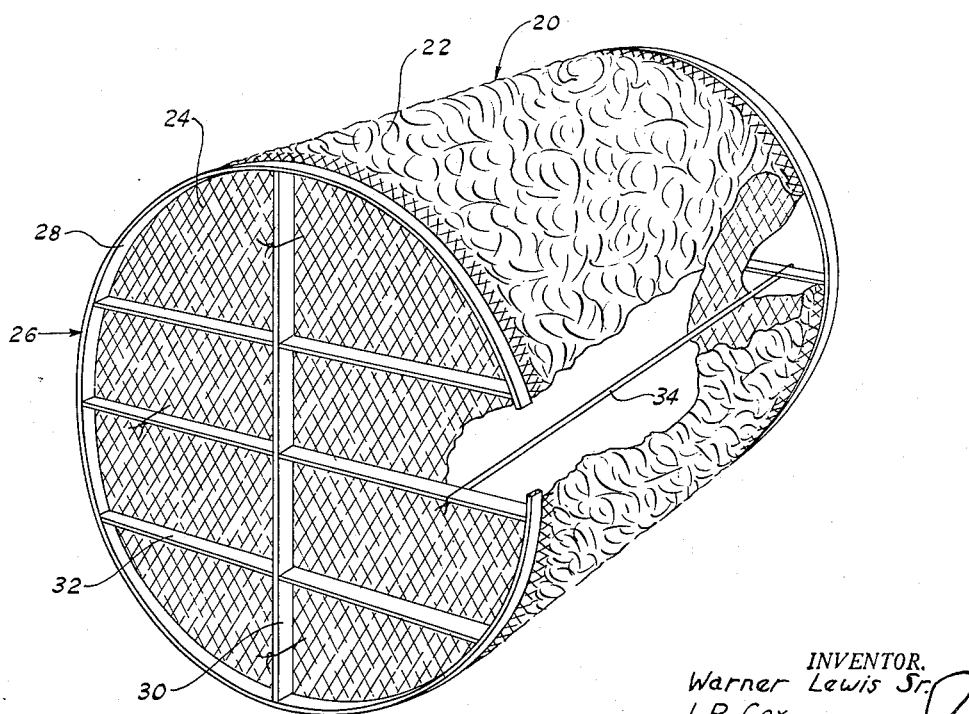
Figure 2 is a perspective view of the repack cartridge shown in Figure 1 with portions of the cartridge broken away for clarity.

The repack cartridge 20 (Figure 2) comprises a cylindrically shaped bundle of excelsior 22 having an outer diameter essentially equal to the inner diameter of the separator 2. The opposite ends of the bundle 22 are covered by a suitable screen 24, such as hardware cloth. Compression grids indicated generally at 26 are also provided at each end of the bundle 22 in contact with the screens 24. Each compression grid 26 comprises a ring 28 having a vertical bar 30 and a plurality of horizontal bars 32 secured therein. Four (but not limited thereto) wires 34 extend longitudinally through the excelsior bundle 22 and interconnect the compression grids 26. When the cartridge 20 is assembled, the wires 34 are placed under tension to compress the bundle 22 through the medium of the compression grids 26 and the screens 24.

*Operation*

To install a repack cartridge 20 in a separator 2 it is simply necessary to remove the head portion 12 and insert the cartridge 20 into the separator against the grid member 18. As it is well known, a bundle of excelsior tends to expand when saturated with moisture. However, the expansion of the excelsior is a comparatively slow process, therefore (preferably but not limited thereto), a few minutes (approximately thirty) prior to the installation of the cartridge 20 in the separator 2 the excelsior bundle 22 may be completely saturated with water. It will be apparent that the preformed repack cartridge also may be inserted in the separator prior to any saturation with water. As the excelsior 22 expands in the separator 2, the tension wires 34, in cooperation with the compression grids 26 and screens 24, preclude longitudinal expansion of the bundle 22, constraining the bundle to expand in a radial direction into close sealing contact with the inner walls of the separator 2. When hydro-carbon fluid is introduced into the separator 2 through the inlet nozzle 4, the pressure of the fluid acting on the exposed end of the cartridge 20 tends to compress the excelsior bundle 22 to increase the radial expansion thereof, and facilitate the sealing of the bundle 22 to the inner walls of the separator 2.

The excelsior 22 operates in the usual manner to separate water entrained in the hydro-carbon fluid passing therethrough. The water accumulates along the lower portion of the separator 2 and drains into the water accumulator 14 and subsequently is removed therefrom through a suitable drain line (not shown).

When it is desired to remove the repack cartridge 20 from the separator 2, the removable head portion 12 is first removed to provide access to the cartridge. The wires 34 are then severed at their connection with the horizontal bars 32 and vertical bar 30 to permit removal of the exposed compression grid 26 and screen 24. The excelsior 22 is then removed by hand or with hay hooks (not shown) as desired. The wires 34 may be clipped or severed several times as the excelsior 22 is removed if they interfere with the removal of the excelsior. When all of the excelsior 22 has been removed, the remaining screen 24 and compression grid 26 are removed to permit insertion of a new repack cartridge 20 in contact with the retaining grid 18.

From the foregoing it is apparent that the present invention provides a novel self sealing repack cartridge for use in an oil and gas separator. The time normally required to repack a separator is substantially reduced when the filtering medium is inserted as a unit. It is also apparent that the present invention provides a practical and efficient repack cartridge which may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In a repack cartridge for a separator comprising a preformed cylindrically shaped bundle of uniformly and evenly packed excelsior, a screen at each end of the bundle, a plurality of wires extending longitudinally through the bundle, and a compression grid over each screen connected to said wires for retaining the uniformly packed excelsior bundle under compression, each of said compression grids comprising a ring conforming substantially to the diameter of the bundle, and cross bars secured to the inner periphery of the ring to distribute the compressive force uniformly over the respective end area of the bundle.

2. In a combined filter and self sealing repack cartridge for use with an oil and gas separator comprising a preformed cylindrical shaped bundle of evenly distributed and uniformly packed excelsior and insertable in the separator as a unit, a screen enclosing opposite ends of the bundle, circular compression grids disposed over the screens, cross bars secured to the inner periphery of the grids, a plurality of proportionately spaced wires extending through the uniformly packed bundle and connected to the cross bars at opposite ends thereof for maintaining longitudinal compression and required density of the cartridge, said uniformly compressed cartridge responsive to wettability and velocity of fluids present in the separator to effect an initial and subsequently maintained radial expansion of the cartridge into sealing contact with the inner walls of the separator.

References Cited in the file of this patent

UNITED STATES PATENTS

| Number | Name | Date |
|---|---|---|
| 413,983 | Theurer | Oct. 29, 1889 |
| 767,859 | Ballance et al. | Aug. 16, 1904 |
| 974,025 | Clark et al. | Oct. 25, 1910 |
| 1,375,422 | Sherer | Apr. 19, 1921 |
| 1,822,368 | Ohlson | Sept. 8, 1931 |
| 1,910,747 | Burhans | May 23, 1933 |
| 2,138,736 | Gaarder | Nov. 29, 1938 |
| 2,248,992 | Holmes et al. | July 15, 1941 |
| 2,265,471 | Burhans | Dec. 9, 1941 |
| 2,298,674 | Burhans | Oct. 13, 1942 |
| 2,363,009 | Lewis | Nov. 21, 1944 |
| 2,412,841 | Spangler | Dec. 17, 1946 |
| 2,520,124 | Chaney et al. | Aug. 29, 1950 |
| 2,548,568 | Swank | Apr. 10, 1951 |